(12) United States Patent
Fukutomi

(10) Patent No.: US 11,300,073 B2
(45) Date of Patent: Apr. 12, 2022

(54) CYLINDER BLOCK ASSEMBLY

(71) Applicant: TOYOTA JIDOSHA KABUSHIKI KAISHA, Toyota (JP)

(72) Inventor: Ippei Fukutomi, Machida (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/883,474

(22) Filed: May 26, 2020

(65) Prior Publication Data
US 2020/0378337 A1 Dec. 3, 2020

(30) Foreign Application Priority Data

May 30, 2019 (JP) .............................. JP2019-101798

(51) Int. Cl.
*F02F 7/00* (2006.01)
*F02B 75/18* (2006.01)
*F16C 9/02* (2006.01)

(52) U.S. Cl.
CPC ............ *F02F 7/0095* (2013.01); *F02B 75/18* (2013.01); *F02F 7/0007* (2013.01); *F02F 7/0053* (2013.01); *F02B 2075/1812* (2013.01); *F16C 9/02* (2013.01); *F16C 2360/22* (2013.01)

(58) Field of Classification Search
CPC ...... F02F 7/0095; F02F 7/0007; F02F 7/0053; F02F 1/102; F02B 75/18; F02B 2075/1812; F02B 75/20; F16C 9/02; F16C 2360/22; F16C 9/045; F16C 35/02
See application file for complete search history.

(56) References Cited

U.S. PATENT DOCUMENTS

| 4,876,998 | A | * | 10/1989 | Wunsche | ............... | F02F 7/0007 |
| | | | | | | 123/198 E |
| 2007/0181091 | A1 | * | 8/2007 | Nagahama | ............. | F01M 11/02 |
| | | | | | | 123/196 R |
| 2017/0175817 | A1 | * | 6/2017 | Ejakov | .................. | F02F 7/0053 |
| 2018/0202389 | A1 | | 7/2018 | Kamiya | | |

FOREIGN PATENT DOCUMENTS

| CN | 104696093 A | 6/2015 |
| JP | 2012-225236 A | 11/2012 |
| JP | 2020-037938 A | 3/2020 |

* cited by examiner

*Primary Examiner* — Syed O Hasan
(74) *Attorney, Agent, or Firm* — Oblon, McClelland, Maier & Neustadt, L.L.P.

(57) ABSTRACT

A cylinder block assembly has: a cylinder block having three cylinders aligned side-by-side; and four crank caps arranged side-by-side in an alignment direction of the cylinders and fastened to the cylinder block. The crank caps and the cylinder block are provided with crank bearings which rotatably support a crankshaft. The crank caps are arranged at both sides of each cylinder in the alignment direction. Intermediate crank caps positioned at intermediate positions in the plurality of the crank caps include removed parts so as to more easily deform when receiving a load from the crankshaft compared with the side crank caps.

13 Claims, 14 Drawing Sheets

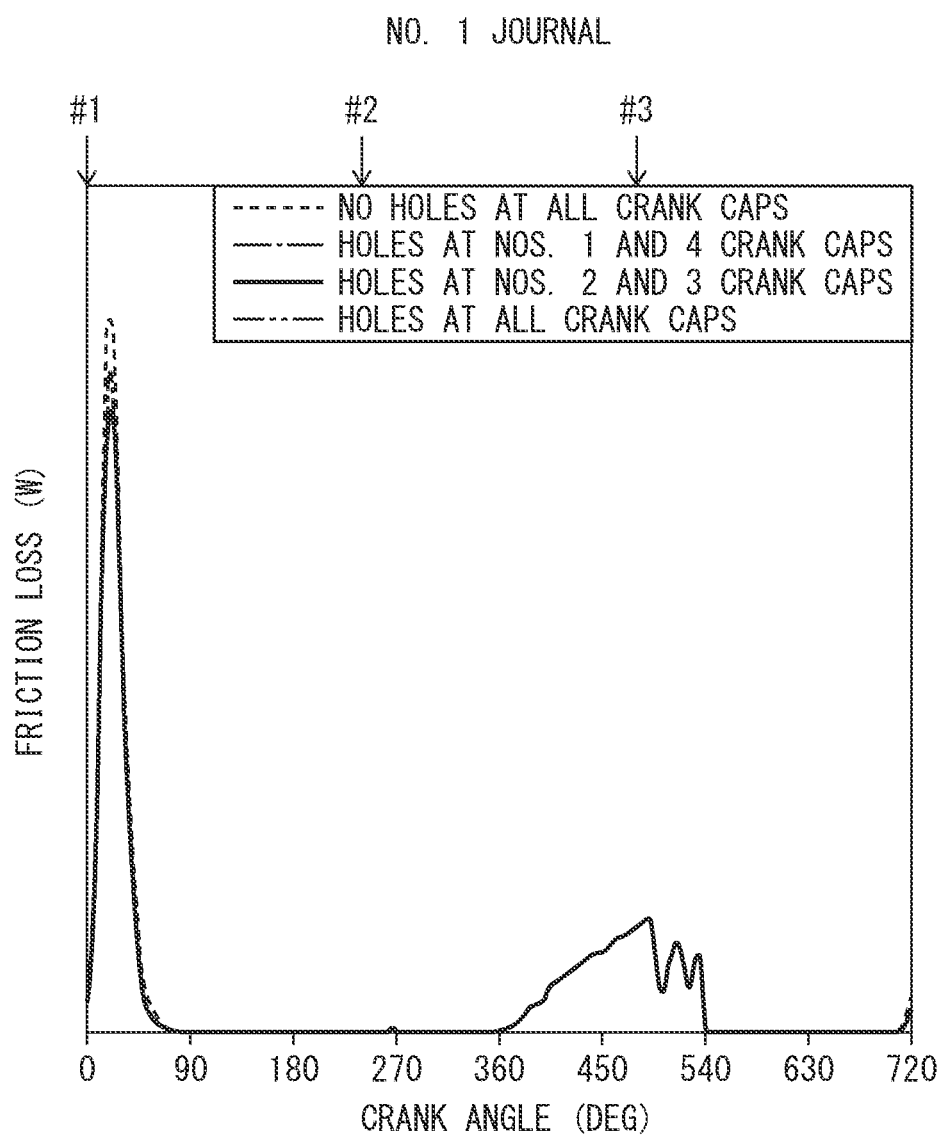

CYLINDER BLOCK ASSEMBLY

FIELD

The present disclosure relates to a cylinder block assembly.

BACKGROUND

In general, an internal combustion engine has a cylinder block assembly provided with a cylinder block and a plurality of crank caps fastened to the cylinder block. At the crank caps and cylinder block, crank bearings supporting crank journals of a crankshaft are formed (for example, PTL 1).

CITATIONS LIST

Patent Literature

[PTL 1] JP 2012-225236 A

SUMMARY

Technical Problem

During operation of the internal combustion engine, when combustion occur in cylinders of the internal combustion engine, a large load acts on the crankshaft. Along with this, a large load acts from the crank journals to the crank bearings as well.

Further, if a large load acts on the crankshaft, along with this, the crankshaft deforms and some of the crank journals become tilted with respect to the crank bearings. As a result, in some of the crank journals, the load acting from the crank journals to the crank bearings locally increases, friction occurs between the crank journals and crank bearings, and the friction loss accompanying this friction increases.

The inventors of the present application discovered, as a result of their research, that by machining the crank caps to form holes and grooves to make the crank caps easier to deform when receiving a load from the crankshaft, it is possible to reduce the friction loss. However, if machining the crank caps in this way, the manufacturing costs and manufacturing time of the cylinder block assembly increase.

In consideration of this problem, an object of the present disclosure is to provide a cylinder block assembly in which the friction loss between the crank journals and the crank bearings is reduced while the manufacturing costs and manufacturing time are kept from increasing, and to provide a method for producing the cylinder block assembly while the manufacturing costs and manufacturing time are kept from increasing.

The present invention has as its gist the following.

(1) A cylinder block assembly comprising: a cylinder block having three cylinders aligned side-by-side; and four crank caps arranged side-by-side in an alignment direction of the cylinders and fastened to the cylinder block, wherein the crank caps and the cylinder block are provided with crank bearings which rotatably support a crankshaft, the crank caps are arranged at both sides of each cylinder in the alignment direction; and two intermediate crank caps positioned at intermediate positions in the plurality of the crank caps arranged side-by-side are configured to have shapes including removed parts which are removed compared with side crank caps positioned at the both ends, so as to more easily deform when receiving a load from the crankshaft compared with the side crank caps.

(2) The cylinder block assembly according to above (1), wherein the removed parts include hole parts extending passing through the crank caps.

(3) The cylinder block assembly according to above (2), wherein one crank cap includes a plurality of the hole parts.

(4) The cylinder block assembly according to above (3), wherein the plurality of the hole parts provided at one crank cap are arranged in a direction perpendicular to an alignment direction of the cylinders and a direction in which the crank caps are attached to the cylinder block.

(5) The cylinder block assembly according to above (3) or (4), wherein the plurality of the hole parts provided at one crank cap have the same shapes as each other.

(6) The cylinder block assembly according to any one of above (2) to (5), wherein the hole parts are formed so as to extend in an alignment direction of the cylinders.

(7) The cylinder block assembly according to any one of above (1) to (6), wherein the removed parts include grooves formed at side surfaces of the crank caps positioned in the alignment direction of the cylinders.

(8) The cylinder block assembly according to above (7), wherein the grooves are formed to be symmetrical shapes on the both side surfaces of the crank caps positioned in the alignment direction of the cylinders.

(9) The cylinder block assembly according to any one of above (1) to (8), wherein at least parts of the removed parts are arranged so as to overlap bearings of the crank caps when viewed in the direction of attachment to the cylinder block.

(10) The cylinder block assembly according to any one of above (1) to (9), wherein the intermediate crank caps have the same shapes as each other.

(11) The cylinder block assembly according to any one of above (1) to (10), wherein the side crank caps have the same shapes as each other.

(12) A method of production of a cylinder block assembly comprising: a cylinder block having three cylinders aligned side-by-side and four crank caps arranged side-by-side in an alignment direction of the cylinders and fastened to the cylinder block to rotatably support a crankshaft, the method comprising steps of:

producing a plurality of crank caps of the same shapes;

performing removal processing for removing part of some of the crank caps among the produced crank caps so as to easily deform when receiving a load from the crankshaft;

assembling the crank caps, to which the removal processing have been performed, to two intermediate crank journals positioned at intermediate positions among a plurality of crank journals of the crankshaft; and assembling crank caps, to which the removal processing have not been performed, to side crank journals positioned at two ends among the plurality of crank journals.

(13) The method of production of a cylinder block assembly according to above (12) wherein the removal processing includes processing for forming hole parts passing through the crank caps or processing for forming grooves at side surfaces of the crank caps positioned in the alignment direction of the cylinders.

Advantageous Effects of Invention

According to the present disclosure, a cylinder block assembly in which the friction loss between the crank journals and the crank bearings is reduced while the manufacturing costs and manufacturing time are kept from increasing, is provided, and a method for producing the cylinder block assembly while the manufacturing costs and manufacturing time are kept from increasing.

BRIEF DESCRIPTION OF DRAWINGS

FIG. 5 is a view showing change in friction loss occurring between a no. 1 journal and a crank bearing of the no. 1 crank cap.

DESCRIPTION OF EMBODIMENTS

Figure 1:
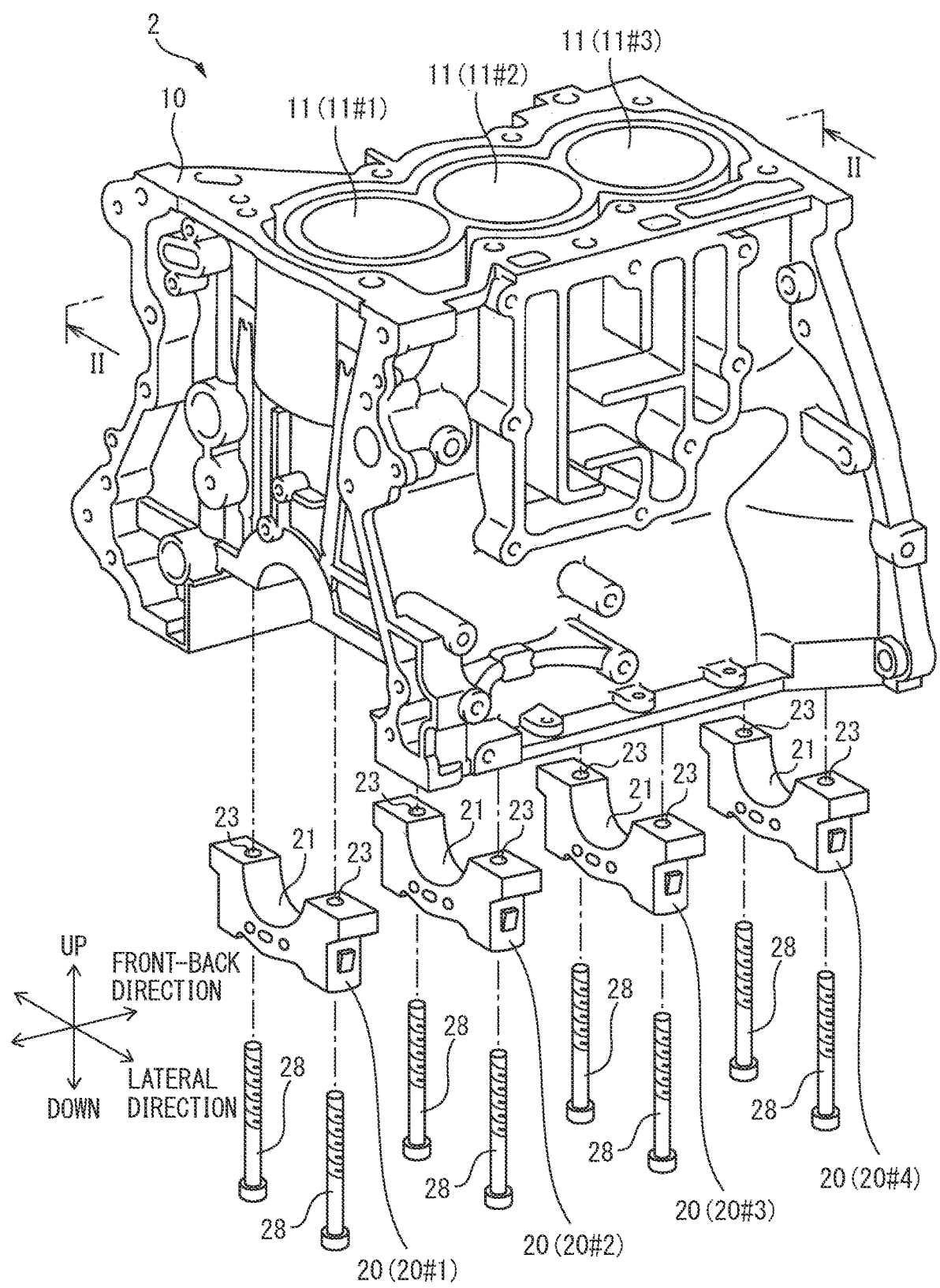
FIG. 1 is a disassembled perspective view of a cylinder block assembly according to one embodiment.

Below, referring to the drawings, an embodiment will be explained in detail. Note that, in the following explanation, similar component elements are assigned the same reference signs.

Configuration of Internal Combustion Engine

Figure 2:
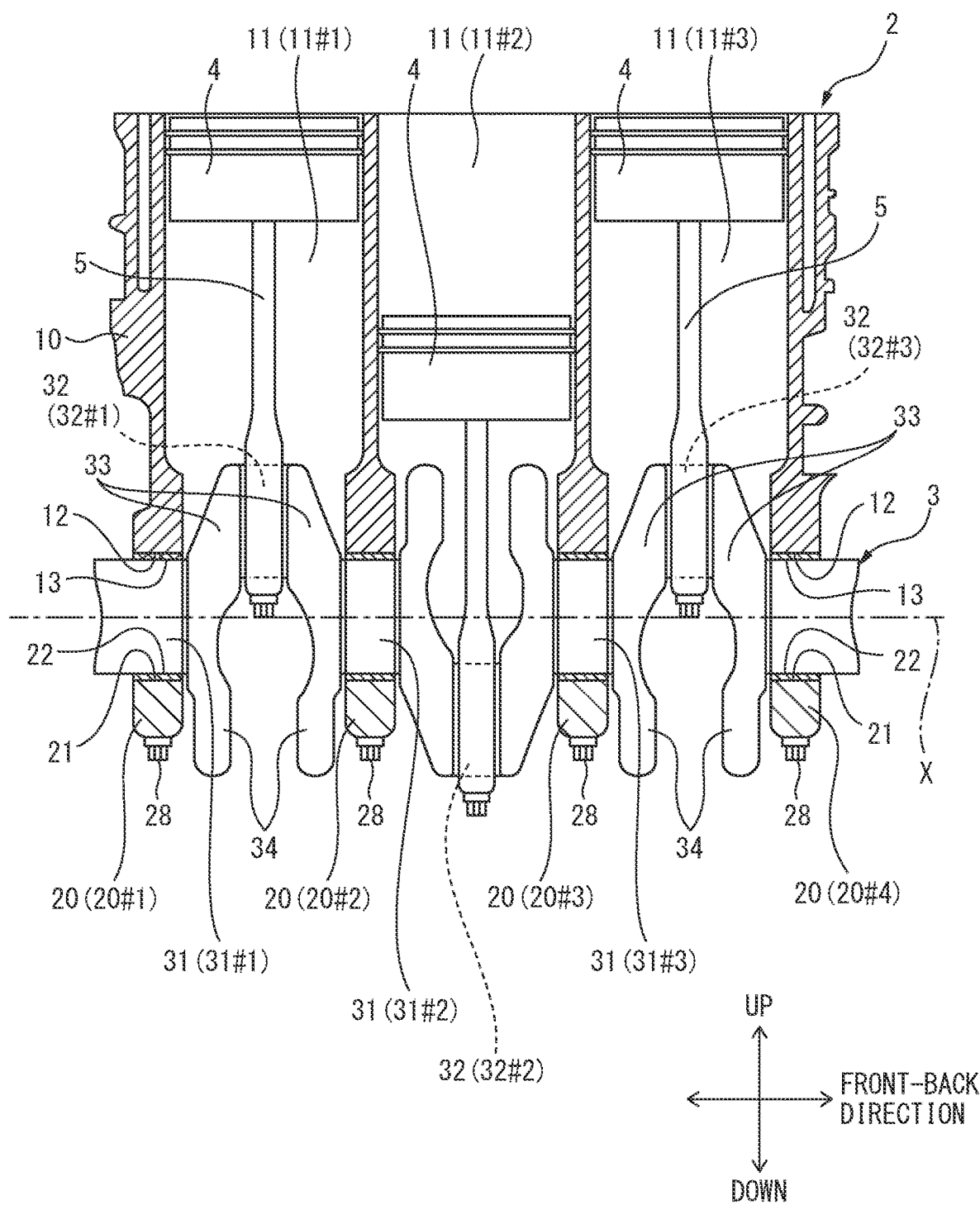
FIG. 2 is a partial schematic cross-sectional view of an internal combustion engine provided with a cylinder block assembly according to one embodiment.

Referring to FIGS. 1 and 2, the configuration of an internal combustion engine provided with a cylinder block assembly according to the present embodiment will be explained. FIG. 1 is a disassembled perspective view of a cylinder block assembly according to the present embodiment. FIG. 2 is a partial schematic cross-sectional view of an internal combustion engine 1 provided with a cylinder block assembly according to present embodiment. In particular, FIG. 2 is a cross-sectional view of the internal combustion engine 1 when viewing the cylinder block assembly along the plane II-II of FIG. 1.

Note that, in this Description, for convenience, the axial direction of the crankshaft, that is, the alignment direction of the cylinders, will be referred to as the "front-back direction". Further, the direction of attachment of the crank caps to the cylinder block (in the present embodiment, also the axial direction of the cylinders) will be referred to as the "up-down direction". In particular, the side where the cylinder block is positioned relative to the crank caps in the "up-down direction" will be referred to as "above", while the side where the crank caps are positioned relative to the cylinder block will be referred to as "below". In addition, the direction perpendicular to these "front-back direction" and "up-down direction" will be referred to as the "lateral direction". Note that these "front-back direction", "up-down direction", and "lateral direction" do not necessarily specify orientations in which the cylinder block assembly is disposed. Therefore, depending on the disposing direction of the cylinder block assembly, for example, the "up-down direction" may also mean the horizontal direction.

The internal combustion engine according to the present embodiment is an in-line 4-cylinder internal combustion engine. As shown in FIG. 2, the internal combustion engine 1 is provided with a cylinder block assembly 2, crankshaft 3, pistons 4, and connecting rods 5. As shown in FIGS. 1 and 2, the cylinder block assembly 2 is provided with a cylinder block 10, a plurality of crank caps (below, also referred to simply as "caps") 20, and a plurality of cap bolts 28 for attaching the caps 20 to the cylinder block 10.

The cylinder block 10 of the cylinder block assembly 2 is provided with a plurality of cylinders 11. In the present embodiment, the cylinder block 10 includes three cylinders 11. The cylinders 11 are formed in the cylinder block 10 so as to be aligned side-by-side in the axial direction of the crankshaft 3 and so that the axes of the cylinders 11 are parallel to each other. In this Description, the three cylinders 11 aligned in one line will be referred to, in order from one end to the other end, as the "no. 1 cylinder 11#1", "no. 2 cylinder 11#2", and "no. 3 cylinder 11#3".

At the bottom surface of the cylinder block 10, a plurality of semicircular recesses 12 are formed. On these recesses 12, crank bearings 13 are provided for rotatably supporting the crankshaft 3. The recesses 12 and crank bearings 13 are arranged aligned in one line in the axial direction of the crankshaft 3. When viewed in the up-down direction, single ones of the recesses 12 and crank bearings 13 are arranged at the either side of each cylinder 11 in the axial direction of the crankshaft 3. Therefore, in the present embodiment, the cylinder block 10 is formed with four recesses 12 and four crank bearings 13 are provided. Bolt holes (not shown) are provided for receiving the cap bolts 28 at the both sides of the crank bearings 13 of the cylinder block 10 in the lateral direction.

The caps 20 includes semicircular recesses 21 at their top parts. The recesses 21 are provided with crank bearings 22 for rotatably supporting the crankshaft 3. Each of the caps 20 is arranged so that the corresponding crank bearing 22 faces one of the crank bearings 13 which are provided at the cylinder block 10. Therefore, in the present embodiment, the cylinder block assembly 2 is provided with four caps 20 aligned in one line in the alignment direction of the cylinders 11. The caps 20 are arranged at the both sides of each cylinder 11 in the axial direction of the crankshaft 3 (alignment direction of cylinders 11) when viewed in the up-down direction.

In this Description, the four caps 20 aligned in one line will be referred to, in order from the end at the no. 1 cylinder 11#1 side to the end at the no. 3 cylinder 11#3 side, as the "no. 1 cap 20#1", "no. 2 cap 20#2", "no. 3 cap 20#3", and "no. 4 cap 20#4". Therefore, as shown in FIG. 2, the no. 1 cap 20#1 and the no. 2 cap 20#2 are arranged at the either side of the no. 1 cylinder 11#1, respectively.

In addition, in this Description, the caps 20 positioned at intermediate positions among the four caps 20 aligned in one line (that is, the no. 2 cap 20#2 and no. 3 cap 20#3) will also be referred to as the "intermediate caps". Further, the caps 20 positioned at the both ends among the four caps 20 aligned in one line (that is, the no. 1 cap 20#1 and no. 4 cap 20#4) will also be referred to as "side caps".

Further, each cap 20 includes two through holes 23 for insertion of cap bolts 28. The through holes 23 extend in the up-down direction and are provided at the both sides of the recesses 21 (crank bearings 22) in the lateral direction.

The cap bolts 28 are used for fastening the caps 20 at the cylinder block 10. The cap bolts 28 are passed through the through holes 23 of the caps 20 and screwed into bolt holes of the cylinder block 10.

The crankshaft 3 is rotatably supported at the cylinder block assembly 2 and includes crank journals (below, simply referred to as "journals") 31, crank pins 32, crank arms 33, and counter weights 34. In the present embodiment, the end part of the crankshaft 3 at the no. 3 cylinder 11#3 side is provided with a flywheel (not shown), while the end part of the crankshaft 3 at the no. 1 cylinder 11#1 side is provided with a pulley (not shown) for driving auxiliary equipment of the internal combustion engine 1.

The journals 31 are positioned so as to extend on the rotational axis X of the crankshaft 3 along the rotational axis X direction. The journals 31 are rotatably supported on the crank bearings 13 provided at the cylinder block 10 and on the crank bearings 22 provided at the caps 20. Therefore, in the present embodiment, the crankshaft 3 includes four journals 31.

In this Description, the four journals 31 aligned in one line will be referred to, in order from the end at the no. 1 cylinder 11#1 side to the end at the no. 3 cylinder 11#3 side, as the "no. 1 journal 31#1", "no. 2 journal 31#2", "no. 3 journal 31#3", and "no. 4 journal 31#4". Therefore, as shown in FIG. 2, the no. 1 journal 31 is supported by the crank bearing 22 of the no. 1 cap 20#1.

In addition, in this Description, the journals positioned at intermediate positions among the four journals 31 aligned in one line (that is, the no. 2 journal 31#2 and no. 3 journal 31#3) will also be referred to as the "intermediate journals". Further, the journals 31 positioned at the two ends among the four journals 31 aligned in one line (that is, the no. 1 journal 31#1 and no. 4 journal 31#4) will also be referred to as "side journals".

The crank pins 32 are arranged so as to be off-centered from the rotational axis X of the crankshaft 3 and extend in parallel to this rotational axis X. The crank pins 32 are arranged between adjacent journals 31. In the present embodiment, the adjacent crank pins 32 are arranged so as to be shifted by 120° from each other about the rotational axis X. The crank pins 32 are rotatably supported at the connecting rods 5.

In this Description, the crank pin connected through a connecting rod 5 to the piston 4 in the no. 1 cylinder 11#1 will be referred to as the "no. 1 crank pin 32#1". Similarly, the crank pin connected through a connecting rod 5 to the piston 4 in the no. 2 cylinder 11#2 will be referred to as the "no. 2 crank pin 32#2", while the crank pin connected through a connecting rod 5 to the piston 4 in the no. 3 cylinder 11#3 will be referred to as the "no. 3 crank pin 32#3".

The crank arms 33 connect the adjacent journals 31 and crank pins 32. The counter weights 34 are arranged so as to extend from the journals 31 in opposite directions from the extending directions of the crank arms 33.

The pistons 4 are arranged in the cylinders 11 to be able to slide in the axial directions of the cylinders. The pistons 4 are coupled through the piston pins (not shown) to the crankshaft 3, and reciprocate up and down in the cylinders 11 along with rotation of the crankshaft 3.

Each connecting rod 5 is coupled at one end through the piston pin to the piston 4, and is coupled at the other end to the crank pin 32 of the crankshaft 3. The connecting rods 5 act to convert the reciprocating motion of the pistons 4 to rotational motion of the crankshaft 3.

Configuration of Crank Caps

Figure 3A:
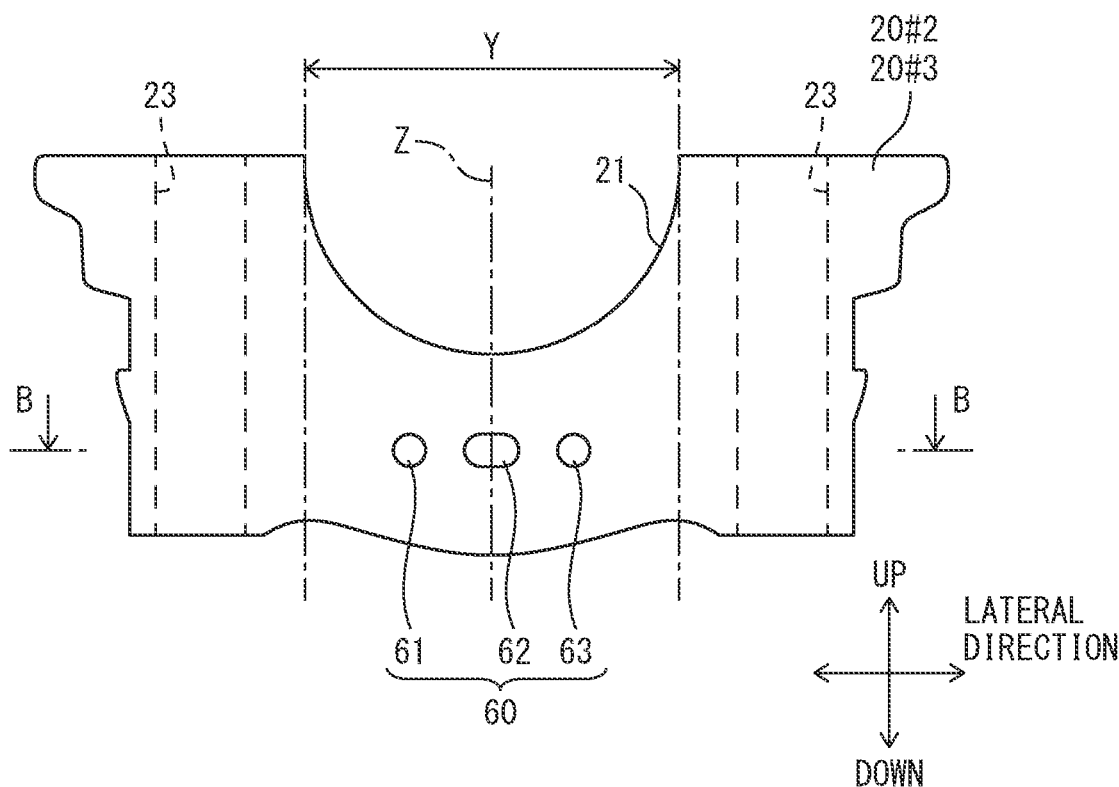
FIGS. 3A and 3B are views showing the configuration of intermediate crank caps.
Figure 3B:
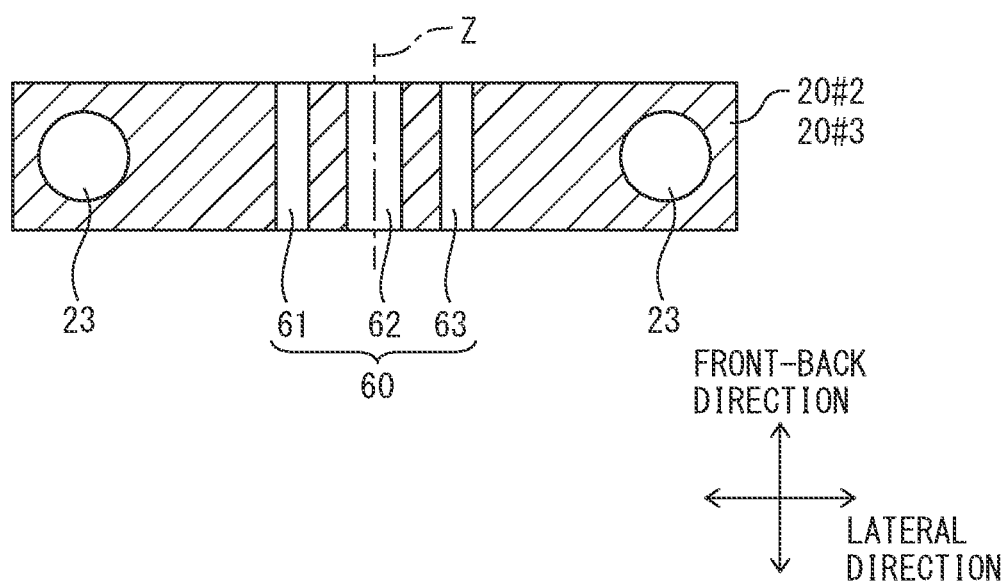

Next, referring to FIGS. 3A and 3B and FIGS. 4A and 4B, the configuration of the crank caps 20 will be specifically explained. FIGS. 3A and 3B are views showing the configuration of the intermediate caps (that is, no. 2 cap 20#2 and no. 3 cap 20#3). FIG. 3A is a side view of the intermediate caps, while FIG. 3B is a cross-sectional plan view when seen along the line B-B of FIG. 3A.

In the present embodiment, the intermediate caps (20#2, 20#3) have the same shapes as each other. As shown in FIG. 3A, each of the intermediate caps includes a plurality of hole parts 60 below the recess 21, that is, below the crank bearing 22 (side opposite to the attaching direction of caps 20 to cylinder block 10). In particular, in the present embodiment, each of the intermediate caps (20#2, 20#3) includes the three hole parts of the first hole part 61, second hole part 62, and third hole part 63.

As shown in FIG. 3B, these three hole parts 60 all extend in the intermediate caps (20#2, 20#3) in the front-back direction (alignment direction of cylinders 11) and parallel with each other, and pass through these caps. Further, as shown in FIGS. 3A and 3B, these three hole parts 60 are arranged side-by-side in the lateral direction. In particular, in the present embodiment, as shown in FIG. 3B, these three hole parts 60 are arranged so as to be positioned on the same plane in a cross-section perpendicular to the up-down direction. In addition, in the present embodiment, these three hole parts 60 are all arranged at the insides of the two ends of the recesses 21 in the lateral direction (that is, two ends of crank bearings 22 in the lateral direction) (that is, are arranged in the region Y in FIG. 3A). In other words, the three hole parts 60 provided in each of crank caps are all arranged to be superposed with the recesses 21 of the crank caps (that is, the crank bearings 22) when viewed in the up-down direction.

The first hole part 61 and third hole part 63 positioned at the both sides in the lateral direction have the same circular cross-sectional shapes in the cross-section perpendicular to the front-back direction. Further, the second hole part 62 positioned at the center in the lateral direction has a substantially elliptical shape (or oval shape) with a long axis extending in the lateral direction and a short axis extending in the up-down direction in the cross-section perpendicular to the front-back direction. These hole parts 60 are formed to be symmetrical with respect to the center plane Z in the lateral direction of the caps.

Figure 4A:
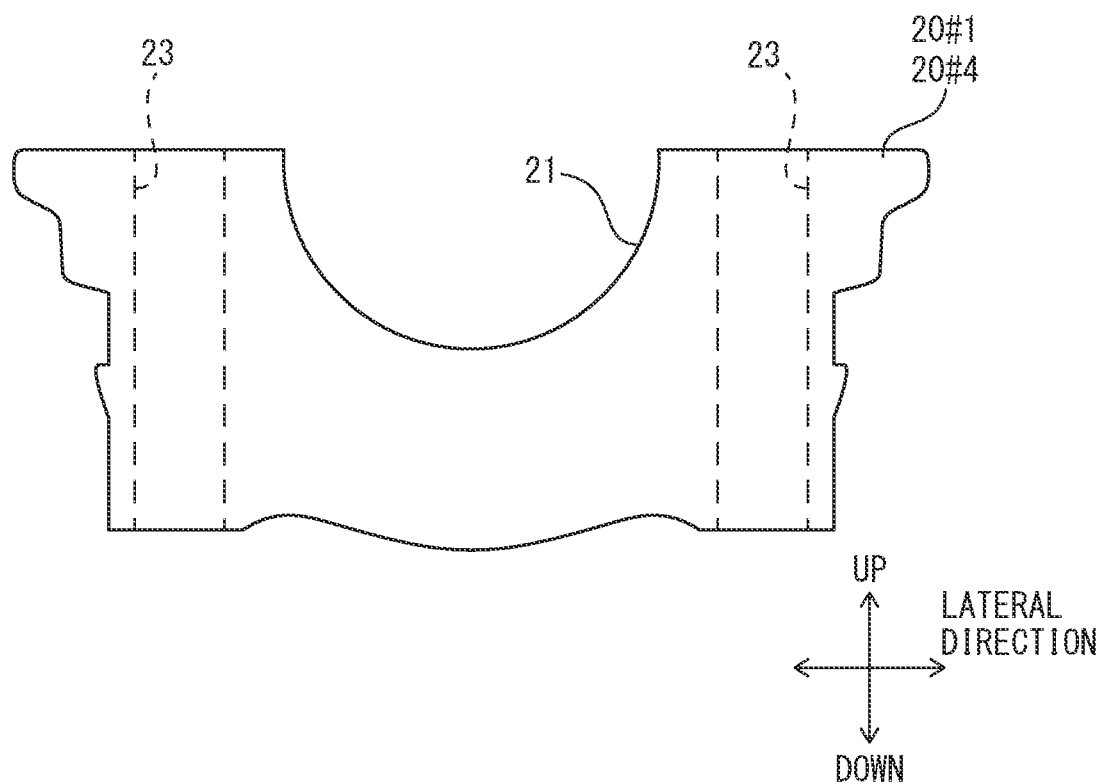
FIGS. 4A and 4B are views showing the configuration of side crank caps.
Figure 4B:
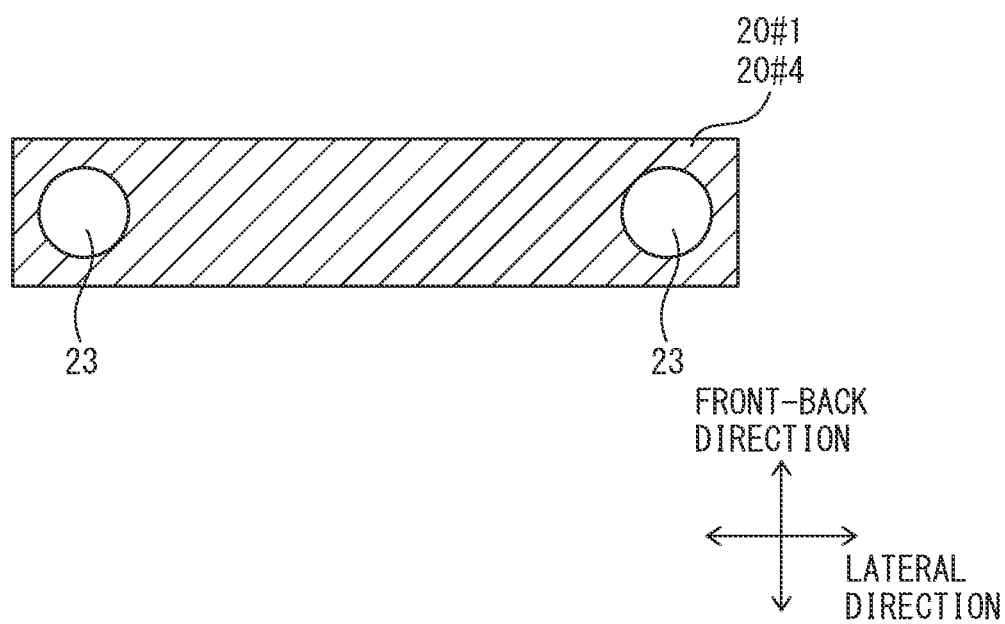

FIGS. 4A and 4B are views showing the configuration of the side caps (that is, no. 1 cap 20#1 and no. 4 cap 20#4). FIG. 4A is a side view of the side caps, while FIG. 4B is a cross-sectional view seen along the line B-B of FIG. 4A. In this embodiment, the plurality of side caps (20#1, 20#4) have the same shapes as each other. As will be understood from FIGS. 4A and 4B, in the present embodiment, the side caps do not include the hole parts such as provided at the intermediate caps (20#2, 20#3). However, the side caps are configured the same as the intermediate caps, except for not being provided with the hole parts.

In this embodiment, as a result of the hole parts 60 being formed at the caps 20 in this way, the intermediate caps (20#2, 20#3) more easily deform when receiving a load from the crankshaft 3, compared with the side caps (20#1, 20#4). In other words, in the present embodiment, the intermediate caps (20#2, 20#3) have hole parts 60 so as to more easily deform when receiving a load from the crankshaft 3, compared with the side caps (20#1, 20#4).

Action and Effects

While the crankshaft 3 is rotating, thin films of oil are formed between the journals 31 and the crank bearings 22 of the caps 20. As a result, even when the crankshaft 3 is rotating, the friction loss accompanying friction resistance occurring between the journals 31 and the crank bearings 22 is small.

However, if the loads from the journals 31 to the crank bearings 22 are locally large, the oil films formed between the journals 31 and the crank bearings 22 are partially broken. As a result, the journals 31 and the crank bearings 22 partially contact each other while the crankshaft 3 is rotating (or the oil films between them become extremely thin) and large friction loss occurs at the journals 31 along with partial contact.

FIGS. 5 to 8 are views showing change in friction loss occurring between the journals 31 and crank bearings 22 of the caps 20 while the crankshaft 3 is rotating by two turns (1 cycle). In the figures, the solid lines show the change in the case where only the no. 2 and no. 3 caps 20 include the hole parts 60, like in the present embodiment, while the broken lines show the change in the case where all caps 20 include the hole parts 60. Further, the two-dot chain lines show the change in the case where all caps 20 are provided with the hole parts 60, while the one-dot chain lines show the change in the case where only the no. 1 and no. 4 caps 20 are provided with the hole parts 60. In addition, in the figures, #1, #2, and #3 respectively show the combustion timings of the no. 1 cylinder 11#1, combustion timings of the no. 2 cylinder 11#2, and combustion timings of the no. 3 cylinder 11#3.

FIG. 5 shows the change in the friction loss occurring between the no. 1 journal 31#1 and the crank bearing 22 of the no. 1 cap 20#1. In FIG. 5, the solid line, the one-dot chain line, and the two-dot chain line are substantially superposed (in the figure, only the solid line is shown). As will be understood from FIG. 5, at the no. 1 journal 31#1, the maximum friction loss occurs when combustion occur at the no. 1 cylinder 11#1. It will be understood that the friction loss occurring at this time is smaller when at least part of the caps 20 includes hole parts 60 (solid line, one-dot chain line, two-dot chain line), compared with when all caps 20 do not have hole parts 60 (broken line). That is, when only the no. 2 and no. 3 caps 20 include the hole parts 60 or when all caps 20 include the hole parts 60, it is possible to keep the friction loss from increasing.

Figure 6:
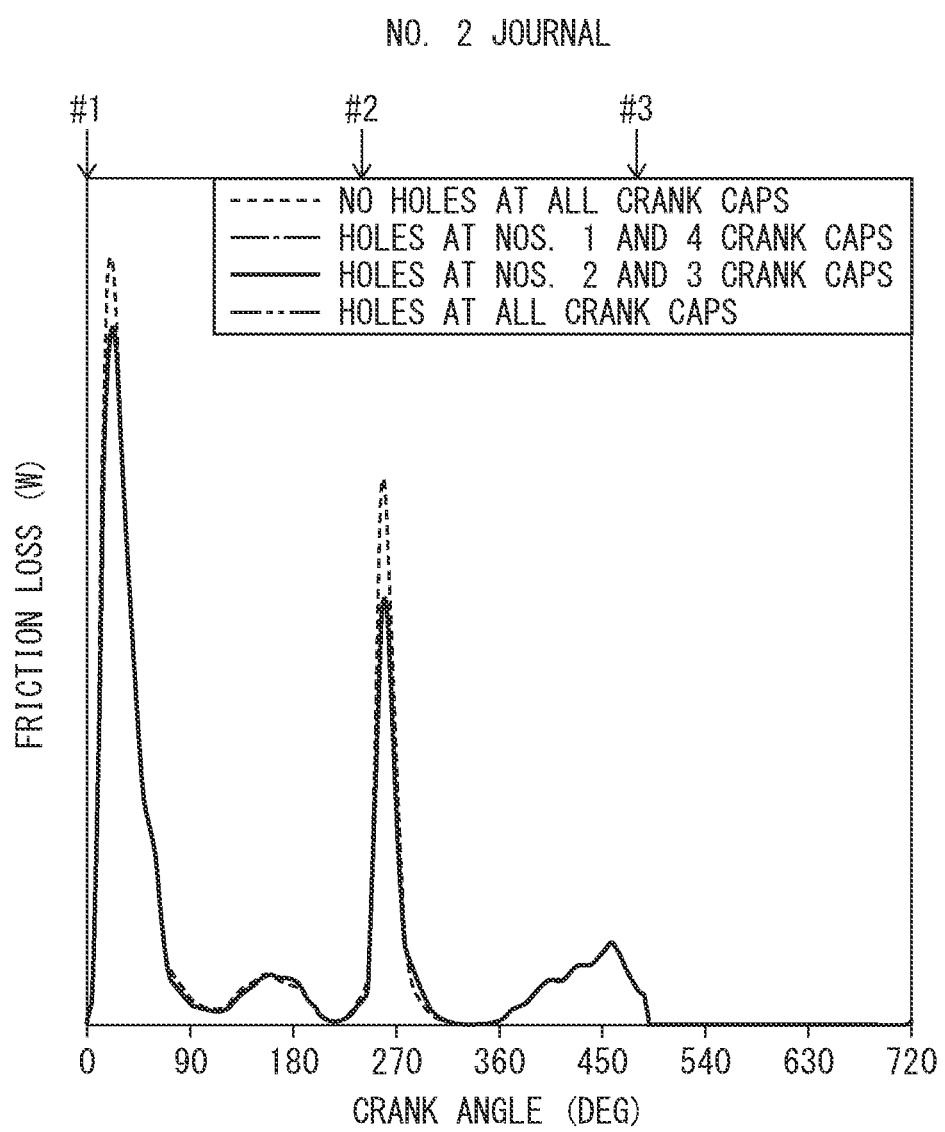
FIG. 6 is a view showing change in friction loss occurring between a no. 2 journal and a crank bearing of the no. 2 crank cap.

FIG. 6 shows the change in friction loss occurring between the no. 2 journal 31#2 and the crank bearing 22 of the no. 2 cap 20#2. In FIG. 6, the broken line and the one-dot chain line are substantially superposed (in the figure, only the broken line shown), while the solid line and the two-dot chain line are substantially superposed (in the figure, only the solid line shown). As will be understood from FIG. 6, at the no. 2 journal 31#2, great friction loss occurs when combustion occur in the no. 1 cylinder 11#1 and no. 2 cylinder 11#2. Compared to when none of the caps 20 include hole parts 60 (broken line) and when only the no. 1 and no. 4 caps 20 include hole parts 60 (one-dot chain line), the friction loss occurring at this time is smaller when only the no. 2 and no. 3 caps 20 include hole parts 60 (solid line) or all caps 20 include the hole parts 60 (two-dot chain line). That is, when only the no. 2 and no. 3 cap 20 include hole parts 60 or when all caps 20 include hole parts 60, the friction loss is kept from increasing.

Figure 7:
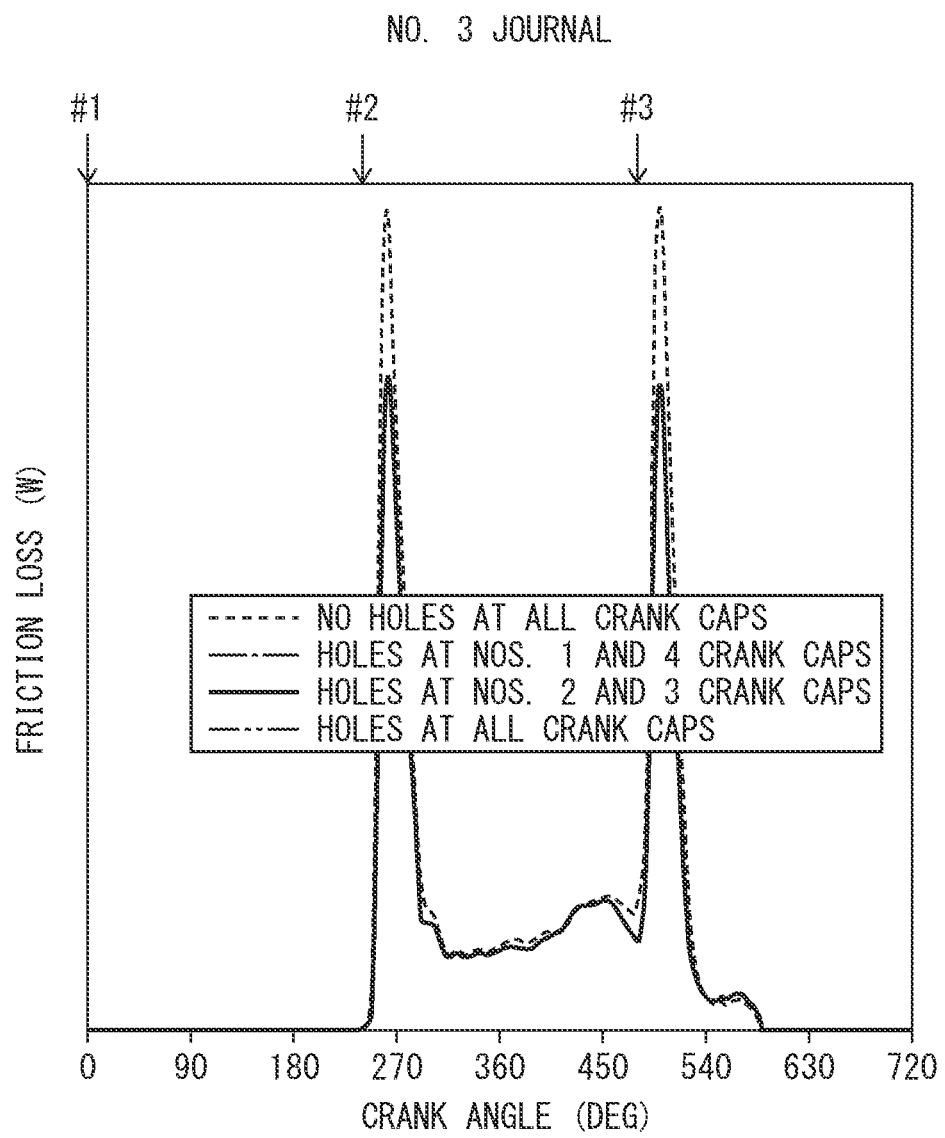
FIG. 7 is a view showing change in friction loss occurring between a no. 3 journal and a crank bearing of the no. 3 crank cap.

FIG. 7 shows the change in friction loss occurring between the no. 3 journal 31#3 and the crank bearing 22 of the no. 3 cap 20#3. In FIG. 7, the broken line and the one-dot chain line are substantially superposed (in the figure, only the broken line shown), while the solid line and the two-dot chain line are substantially superposed (in the figure, only the solid line shown). As will be understood from FIG. 7, at the no. 3 journal 31#3, the greatest friction loss occurs when combustion occur in the no. 2 cylinder 11#2, and no. 3 cylinder 11#3. It will be understood that in the no. 3 journal 31#3, in the same way as the no. 2 journal 31#2, compared to when none of the caps 20 include hole parts 60 (broken line) and when only the no. 1 and no. 4 caps 20 include hole parts 60 (one-dot chain line), the friction loss is smaller when only no. 2 and no. 3 caps 20 include hole parts 60 (solid line) or all caps 20 include the hole parts 60 (two-dot chain line).

Figure 8:
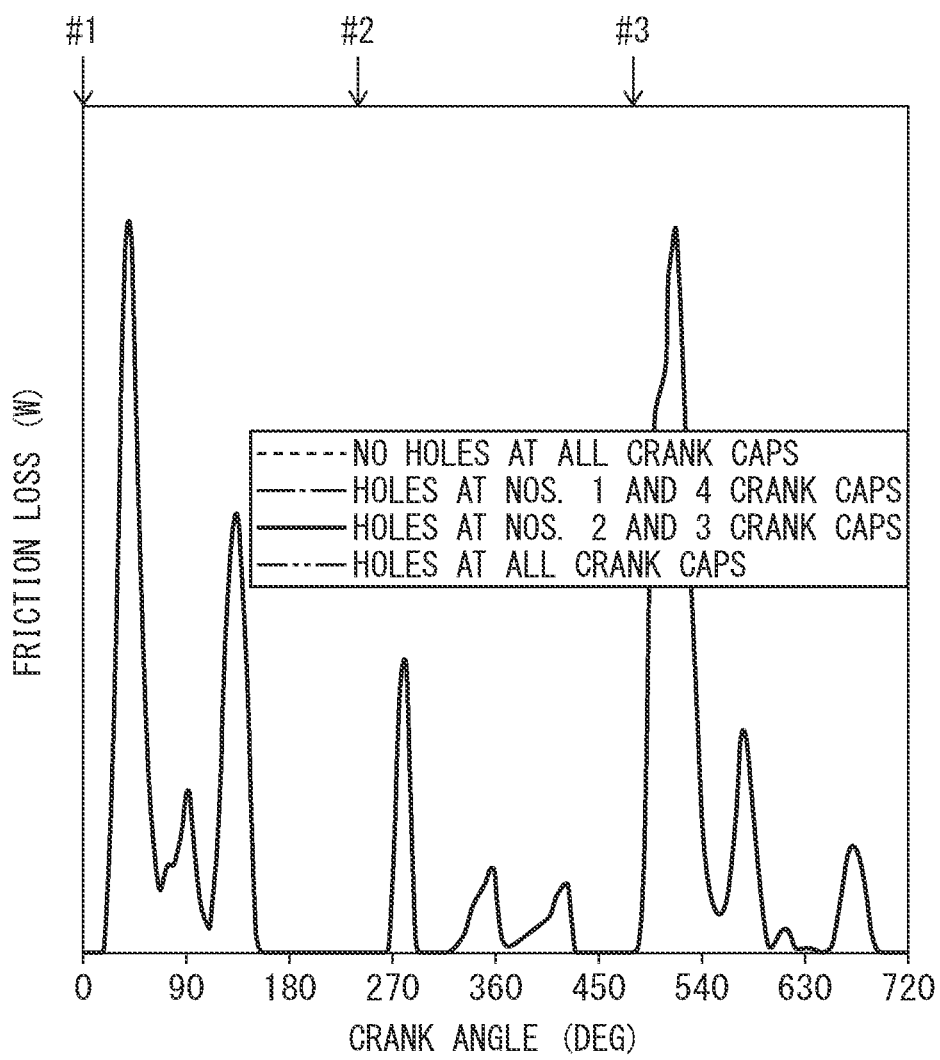
FIG. 8 is a view showing change in friction loss occurring between a no. 4 journal and a crank bearing of the no. 4 crank cap.

FIG. 8 shows the change in friction loss occurring between the no. 4 journal 31#4 and the crank bearing 22 of the no. 4 cap 20#4. In FIG. 8, the solid line, broken line, one-dot chain line, and two-dot chain line are substantially superposed. In the figure, only the solid line is shown. As will be understood from FIG. 8, in the no. 4 journal 31#2, if a combustion occurs in the no. 3 cylinder 11#3, a large friction loss occurs. However, as will be understood from FIG. 8, in the no. 4 journal 31#4, the friction loss does not change due to whether or not the caps 20 include the hole parts 60.

Due to the above, by providing all caps 20 or only the no. 2 and no. 3 caps 20 with hole parts 60 like in the present embodiment, it is possible to reduce the friction loss at mainly the no. 2 journal 31#2 and no. 3 journal 31#3, and accordingly possible to reduce the friction loss at the crankshaft 3 as a whole.

Further, in the present embodiment, only the no. 2 and no. 3 caps 20 include hole parts 60. The no. 1 and no. 4 caps 20 do not include hole parts 60. As a result, it is possible to reduce the manufacturing costs and manufacturing time of the cylinder block assembly. Below, the reasons will be explained.

In manufacturing the caps, the caps may be manufactured by machining. In this case, first, caps not including hole parts 60 are manufactured by machining, and then the hole parts 60 are formed in some of the caps by drilling. Therefore, the caps including the hole parts 60 require one more manufacturing step, compared with the caps not including the hole parts 60.

For this reason, the manufacturing costs and manufacturing time required for the caps including the hole parts 60 are greater than the manufacturing costs and manufacturing time required for the caps not including the hole parts 60. Therefore, in consideration of the manufacturing costs and manufacturing time of the caps as a whole, the smaller the number of caps including the hole parts 60, the better.

In this regard, in the present embodiment, only the no. 2 and no. 3 caps 20 include hole parts 60. The no. 1 and no. 4 caps 20 do not include the hole parts 60. Therefore, the number of caps where hole parts 60 are included can be reduced. Accordingly, it is possible to reduce the manufacturing costs and manufacturing time of the cylinder block assembly. From the above, according to the present embodiment, it is possible to reduce the friction loss between the crank journals and crank bearings, while reducing the manufacturing costs and manufacturing time of the cylinder block assembly.

Further, in the present embodiment, single cap 20 includes a plurality of hole parts 60. For this reason, between adjoining hole parts 60 (for example, between the first hole part 61 and the second hole part 62), beams extending substantially in up-down direction are formed. As a result, easily deformable regions are formed over broad ranges in the lateral directions of the caps 20, while parts of the caps 20 around the hole parts 60 are kept from deforming greatly more than necessary.

Modifications

Next, referring to FIG. 9A to FIG. 13, modifications of the above embodiment will be explained. In the following modifications, the configurations of the caps 20, in particular the configurations of the hole parts formed in the caps 20, differ from the above embodiment.

Figure 9A:
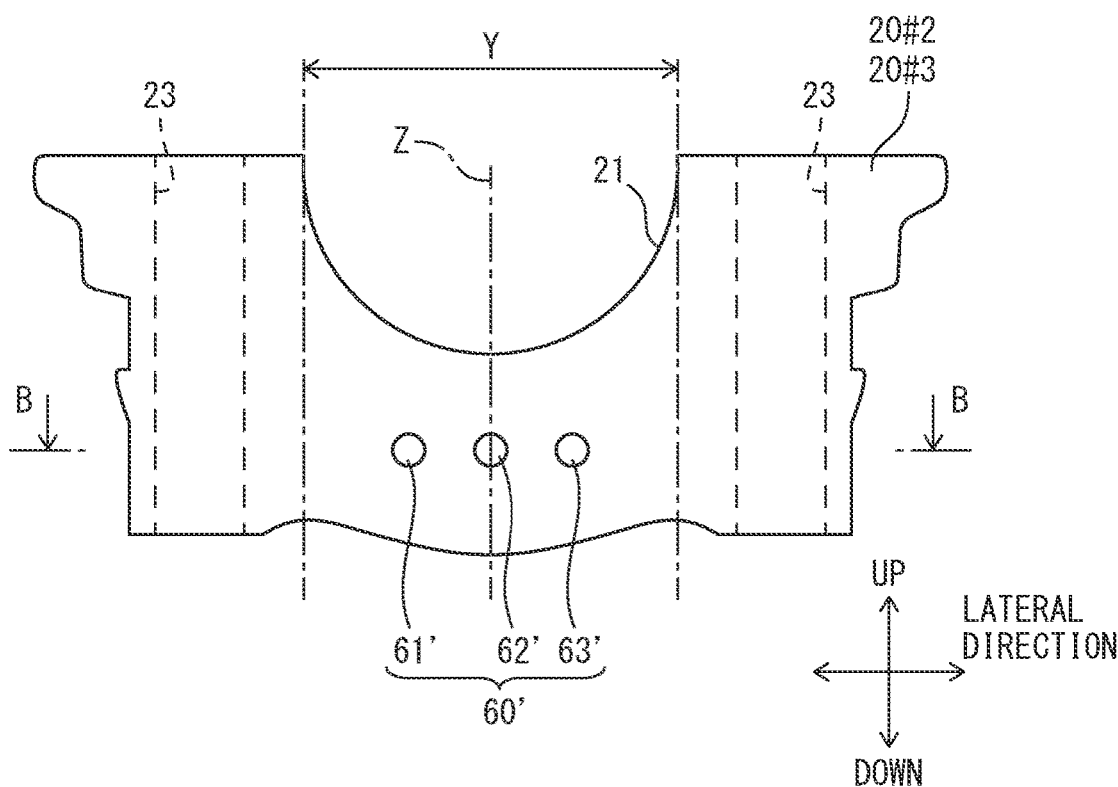
FIGS. 9A and 9B are views showing the configuration of intermediate crank caps of a first modification.
Figure 9B:
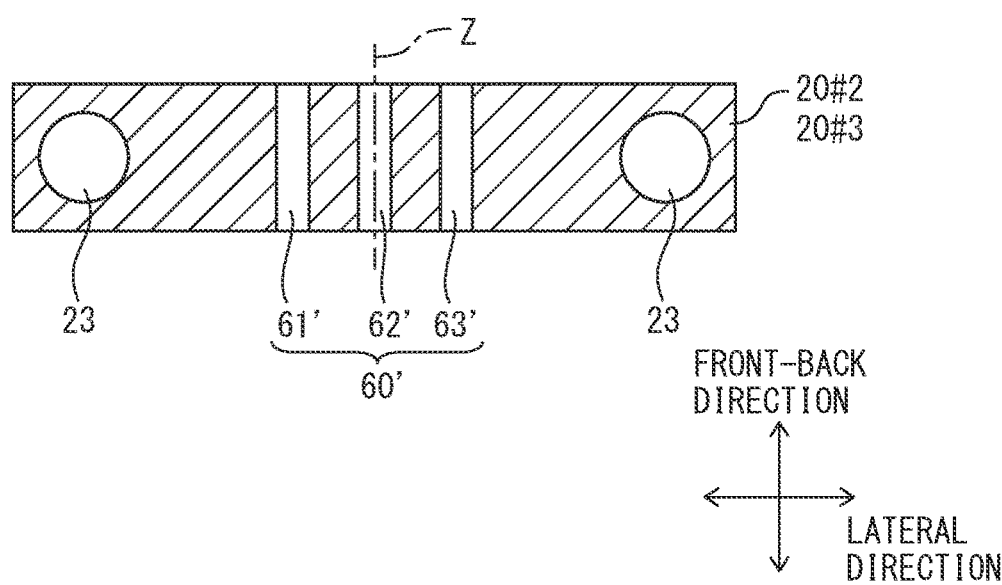

FIGS. 9A and 9B are views showing configurations of intermediate caps according to the first modification. FIG. 9A is a side view of the intermediate caps, while FIG. 9B is a cross-sectional plan view seen along the line B-B of FIG. 9A.

As will be understood from FIGS. 9A and 9B, in the first modification, each of intermediate caps (20#2, 20#3), in the same way as the above embodiment, includes three hole parts 60' of the first hole part 61', second hole part 62', and the third hole part 63'. These three hole parts 61', 62', and 63' all have the same circular cross-sectional shapes in the cross-sections perpendicular to the front-back direction. Therefore, these three hole parts 61', 62', and 63' provided in a single cap 20 have the same shapes as each other.

According to the first modification, the three hole parts 60' have the same circular cross-sectional shapes, therefore in forming the hole parts 60' at the caps, it is possible to use a single drill to form all hole parts 60'. Therefore, according to the first modification, it is possible to facilitate manufacture of the caps 20.

Figure 10A:
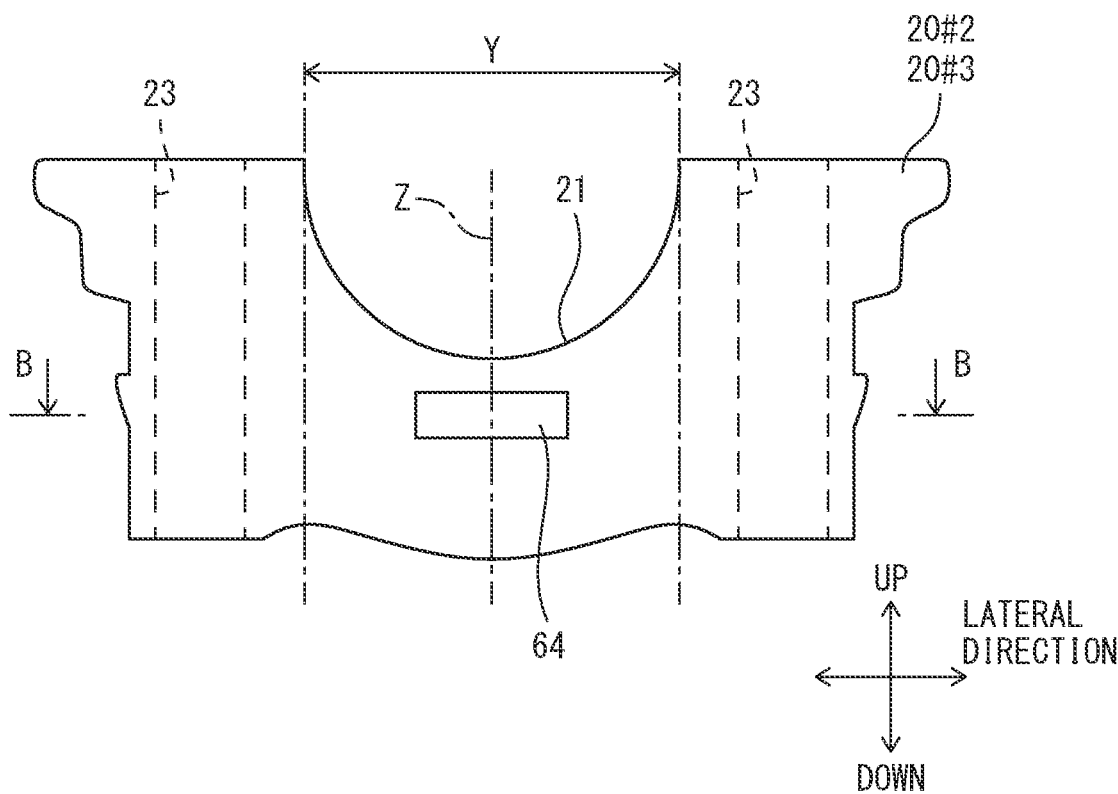
FIGS. 10A and 10B are views showing the configuration of intermediate crank caps of a second modification.
Figure 10B:
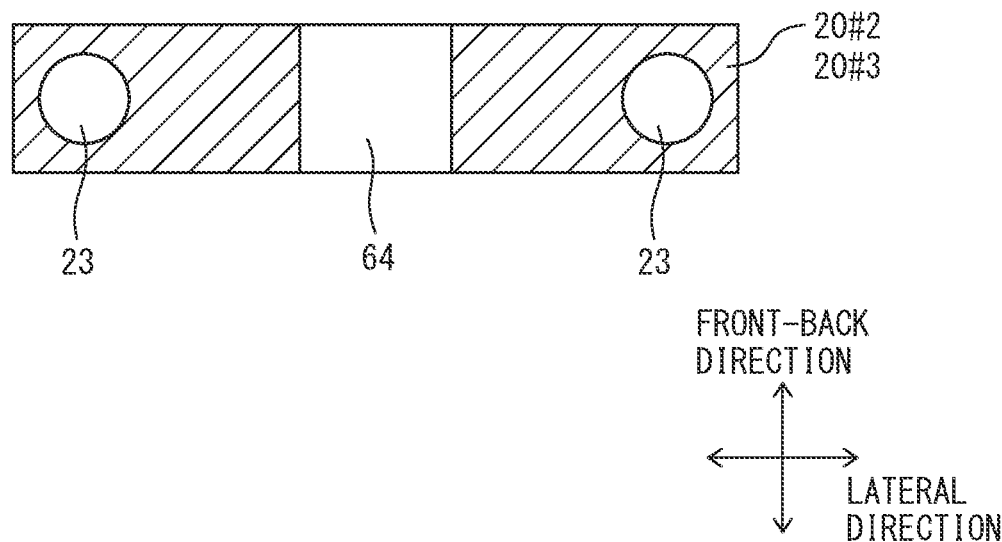

FIGS. 10A and 10B are views showing the configuration of the intermediate caps according to a second modification (20#2, 20#3). FIG. 10A is a side view of the intermediate caps, while FIG. 10B is a cross-sectional plan view seen along the line B-B of FIG. 10A.

As will be understood from FIGS. 10A and 10B, in the second modification, each of the intermediate caps (20#2, 20#3) includes single hole part 64. The hole part 64 extends in the front-back direction so as to pass through the intermediate caps.

Further, the hole parts 64 at the second modification have substantially rectangular cross-sectional shapes in which the long sides extend in the lateral direction and short sides extend in the up-down direction in the cross-section perpendicular to the front-back direction. The hole part 64 in the second modification, when viewed in the up-down direction, is arranged to be positioned at the inside of the two ends of the recess 21 in the lateral direction (that is, arranged in the region Y in FIG. 10A). In particular, the hole parts 64 in the second modification are formed so as to be symmetrical with respect to the center plane Z in the lateral direction of the caps 20.

As shown in the first and second modifications, each of the intermediate caps (20#2, 20#3) may have only single hole part or may also have three hole parts. Alternatively, each of the intermediate caps may also have pluralities of hole parts other than three parts (two, four, five, etc.)

However, regardless of the numbers of hole parts provided at these caps 20, these hole parts are preferably formed so as to extend in the front-back direction. Further, they are preferably formed so as to extend passing through the caps 20. By forming the hole parts in this way, drilling becomes easier. In addition, when each of the cap 20 includes pluralities of hole parts, these hole parts are preferably arranged side-by-side in the front-back direction.

Further, in the cross-sections perpendicular to the front-back direction, the hole parts may have cross-sectional shapes other than circular, elliptical, oval, or rectangular shapes. Further, if each of the caps 20 includes pluralities of hole parts, the cross-sectional shapes of these hole parts in the cross-section perpendicular to the front-back direction are preferably the same shapes as each other.

Whatever the case, the eases of deformation of the caps 20 change according to the numbers, shapes, and positions of the hole parts provided at the caps 20. Therefore, the numbers, shapes, and positions of the hole parts provided at the caps 20 are designed based on the extents by which the corresponding journals 31 tilt due to deformation when combustion loads are applied to the crankshaft 3, etc. Therefore, if the extents by which the corresponding journals 31 tilt due to deformation when combustion loads are applied to the crankshaft 3 differ for each journal 31, the numbers, shapes, and positions of the hole parts provided at the caps 20 may be designed to differ for each cap 20.

Figure 11A:
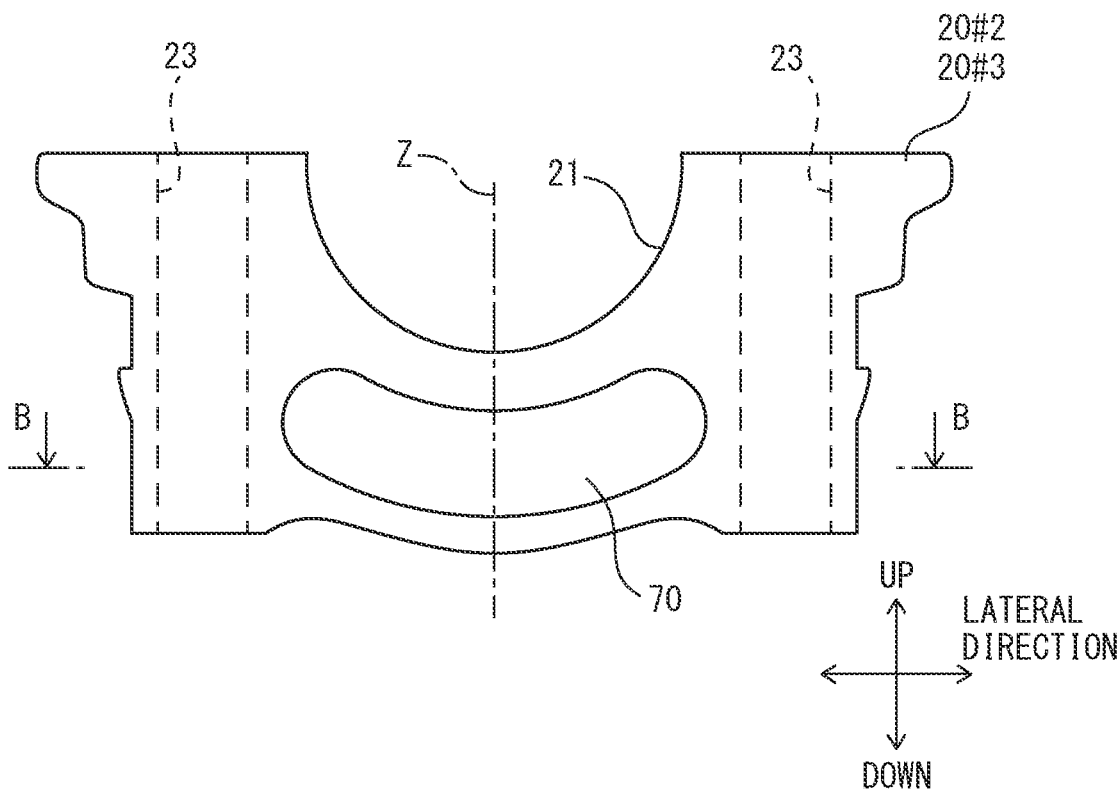
FIGS. 11A and 11B are views showing the configuration of intermediate crank caps of a third modification.
Figure 11B:
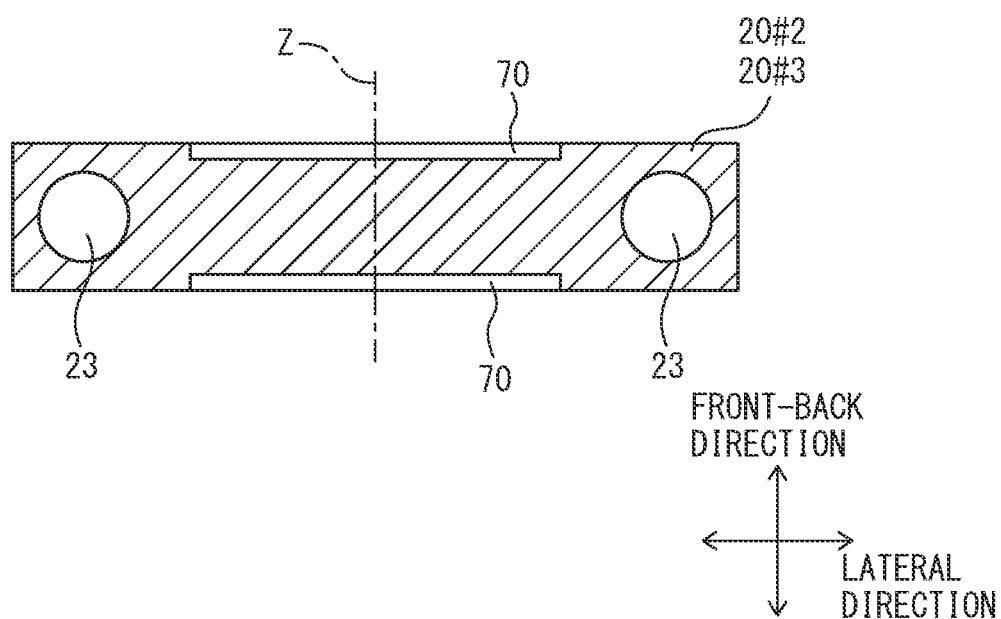

FIGS. 11A and 11B are views showing the configuration of intermediate caps (20#2, 20#3) according to a third modification. FIG. 11A is a side view of the intermediate cap, while FIG. 11B is a cross-sectional plan view seen along the line B-B of FIG. 11A.

As will be understood from FIGS. 11A and 11B, in the third modification, intermediate caps (20#2, 20#3) include grooves 70. Single groove 70 are provided at each lateral surface of the caps 20 positioned in the front-back direction. The grooves 70 are formed so as to extend in the lateral direction. In particular, in the present embodiment, the grooves 70 are separated from the recess 21 and curve to follow the outer circumference of the recess 21. Further, in the present embodiment, the grooves 70 are formed so as to have the same depths over their entireties.

Furthermore, in the present embodiment, the two grooves 70 provided at the two lateral surfaces of the intermediate cap (20#2, 20#3) are formed so as to be symmetric shapes with respect to the plane perpendicular to the front-back direction. In addition, the grooves 70 are formed so as to be symmetric with respect to the center plane Z in the lateral direction of the cap 20.

Further, at least parts of the grooves 70 (preferably all) are arranged at the inside of the two ends of the recess 21 in the lateral direction when viewed in the up-down direction (that is, arranged inside the region Y in FIG. 3A). In other words, at least parts of the grooves 70 (preferably all) are arranged so as to overlap the recesses 21 of the crank caps (that is, the crank bearings 22) when viewed in the up-down direction.

In the third modification, the grooves 70 extend at the same depths over certain extents of the lengths in the lateral direction. Therefore, the caps 20 of this modification evenly easily deform over the ranges over which the grooves 70 extend.

Further, in the third modification, the grooves 70 are arranged separated from the recesses 21. Therefore, provision of the grooves 70 will not cause the surface area forming the recesses 21 to become smaller. If the surface area forming the recesses 21 becomes smaller, the surface area supporting the crankshaft 3 becomes smaller and the stress acting on the surfaces of the recesses 21 becomes greater. According to this modification, the stress is kept from becoming greater in this way.

In addition, in the third modification, the two grooves 70 are formed into shapes symmetric with respect to each other. Further, the grooves 70 are formed to become symmetric with respect to the plane Z. For this reason, the ease of deformation of the caps 20 is symmetric in the front-back direction and lateral direction. As a result, the stresses applied to the caps 20 are kept from being uneven.

Note that, in the third modification, the grooves 70 have depths which are constant overall. However, the depths of the grooves 70 may also differ for each region. By this, the ease of deformation of the caps 20 can be adjusted for each region. Further, in a third modification, each of the side surfaces of the caps 20 includes only single groove 70. However, each of the side surfaces of the caps 20 may also include pluralities of grooves.

Figure 12A:
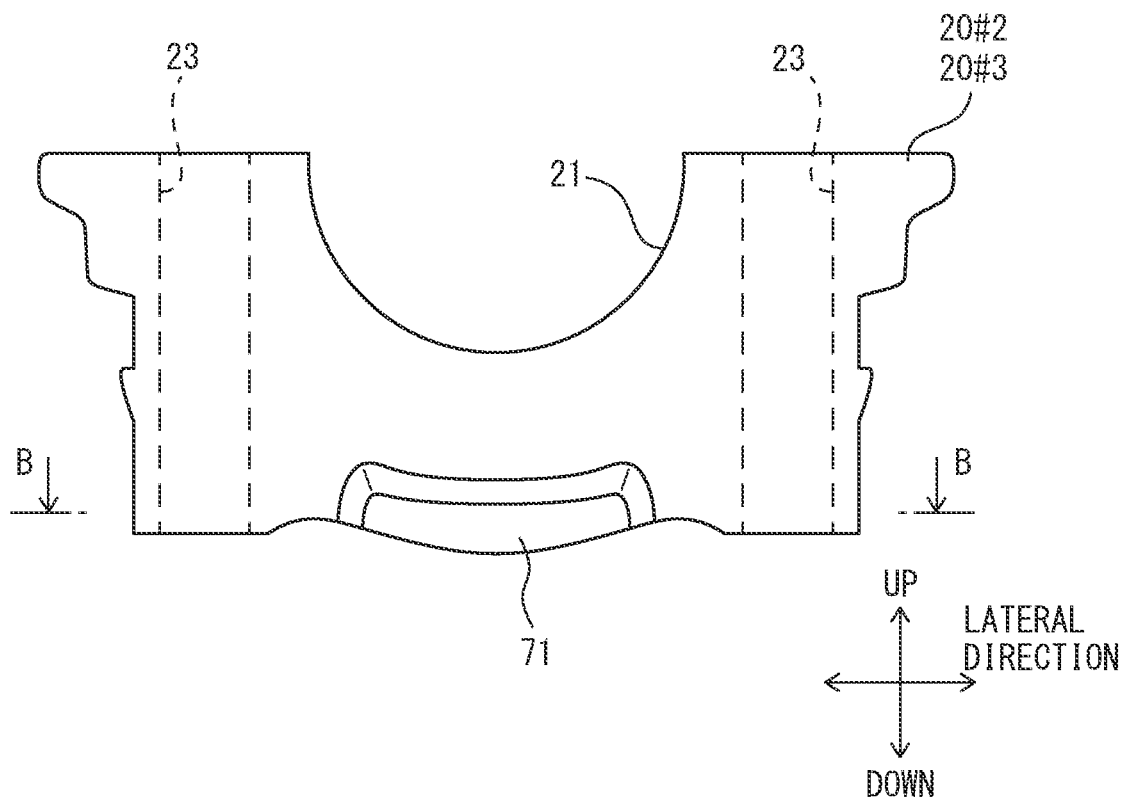
FIGS. 12A and 12B are views showing the configuration of intermediate crank caps of a fourth modification.
Figure 12B:
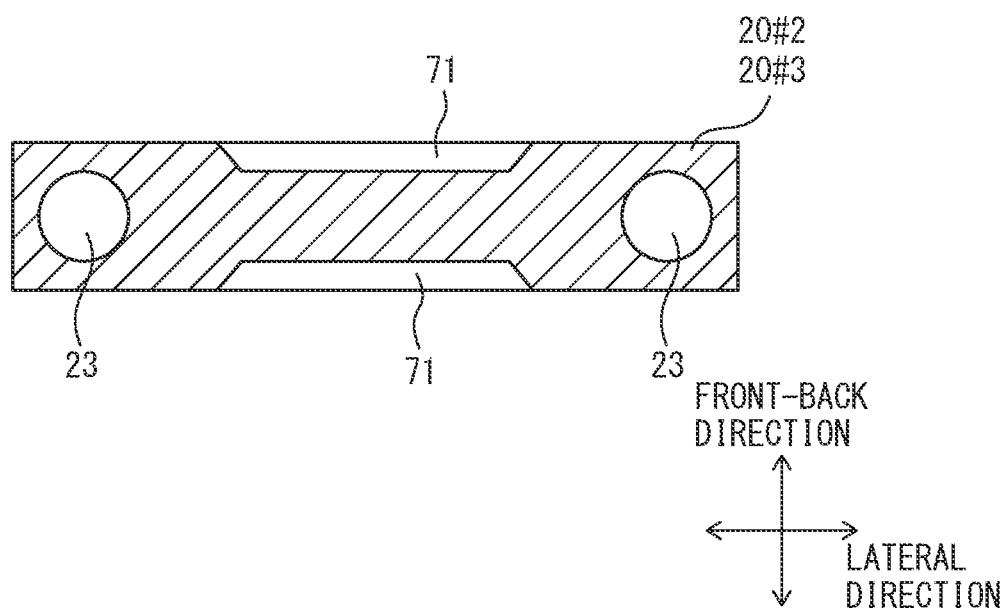

FIGS. 12A and 12B are views showing the configuration of an intermediate cap (20#2, 20#3) according to a fourth modification. FIG. 12A is a side view of an intermediate cap, while FIG. 12B is a cross-sectional plan view seen along the line B-B of FIG. 12A.

As will be understood from FIGS. 12A and 12B, in the fourth modification, the intermediate caps (20#2, 20#3) include grooves 71 in the same way as the third modification. However, in the fourth modification, the grooves 71, unlike the grooves 70 of the third modification, extend so as to continue to the bottom surfaces of the caps 20. On the rest of the points, the grooves 71 of the fourth modification have configurations similar to the grooves 70 of the third modification.

Figure 13:
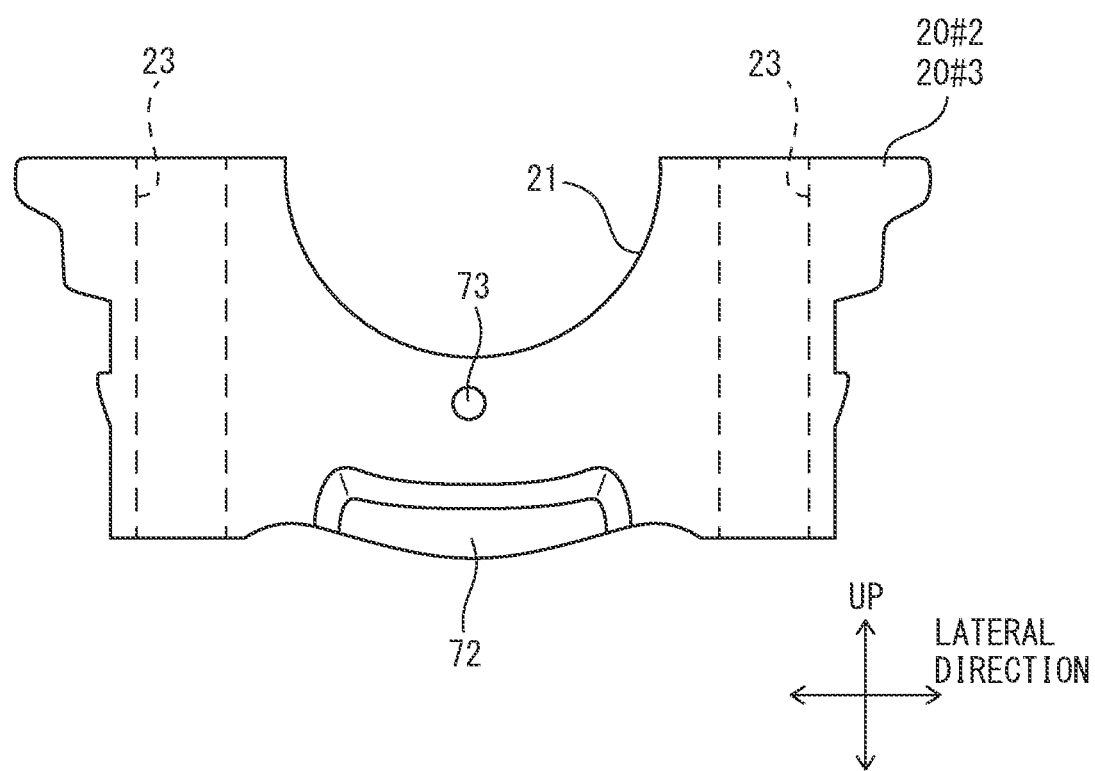
FIG. 13 is a view of the configuration of intermediate crank caps of a fifth modification.

FIG. 13 is a view of the configuration of the intermediate caps (20#2, 20#3) according to a fifth modification. FIG. 13 is a side view of an intermediate cap.

As will be understood from FIG. 13, in the fifth modification, the intermediate caps (20#2, 20#3) include the grooves 72 and single hole parts 73 having a circular cross-section. The grooves 72 are formed in the same way as the grooves 71 of the fourth modification. Further, the hole parts 73 are provided between the grooves 72 and the recesses 21.

Note that, in the fifth modification, one groove 70 is provided on each side surface of the cap 20, but a plurality of grooves may also be provided thereon. Further, in the cap 20 of the fifth modification, only one circular cross-section hole part 73 is provided, but a plurality of hole parts of any cross-sectional shapes may also be provided. In addition, in the cap 20 of the fifth modification, the hole part 73 is provided between the groove 72 and the recess 21, but the groove 72 and the hole part 73 may be arranged in any positional relationship.

If summarizing the above embodiments and modifications, it may be said that the intermediate caps (20#2, 20#3) are configured to have shapes including removed parts (that is, hole parts and grooves), which are removed compared with the shapes of the side caps, so as to more easily deform when receiving a load from the crankshaft compared to side caps (20#1, 20#4).

In particular, in the above embodiment and modifications, the removed parts are arranged separated from the recesses 21. Therefore, the surface areas forming the recesses 21 can be kept from becoming smaller by providing the removed parts, and accordingly the stress acting on the surfaces forming the recesses 21 can be kept from becoming larger.

Method of Production of Cylinder Block Assembly

Figure 14:
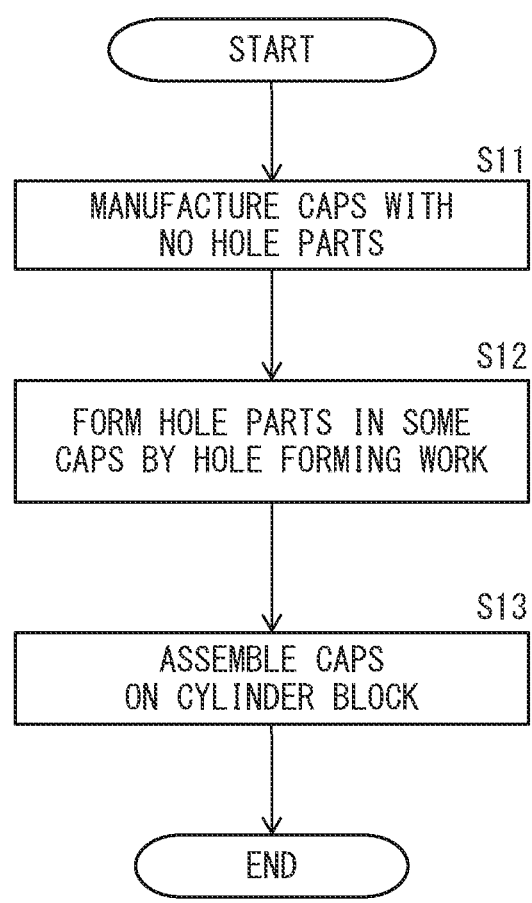
FIG. 14 is a flow chart showing a manufacturing procedure of a cylinder block assembly provided with the caps shown in FIGS. 3A and 3B and FIGS. 4A and 4B.

Next, referring to FIG. 14, the method of production of the cylinder block assembly will be explained. FIG. 14 is a flow chart showing a manufacturing procedure of the cylinder block assembly provided with the caps 20 shown in FIGS. 3A and 3B and FIGS. 4A and 4B.

First, at step S11, caps at which no hole parts 60 (or grooves 70) are formed, are produced. Specifically, for example, caps at which no hole parts 60 are provided (below, these caps also referred to as "unprocessed caps") are produced by machining the outer circumferences of block shaped blanks.

Next, at step S12, some of the unprocessed caps produced at step S11 are formed with holes. Due to this, hole parts 60 passing through the unprocessed caps are formed in the unprocessed caps. As a result, caps in which holes have been formed (below, also referred to as "processed caps") is more easily deform when receiving a load from the crankshaft 3 after being attached to the cylinder block 10, compared with unprocessed caps.

Note that, if providing grooves 70 such as shown in FIGS. 11A and 11B instead of the hole parts 60, the caps are cut at step S12 whereby the side surfaces of the unprocessed caps (in particular, the side surfaces positioned in the front-back direction when assembled on the cylinder block 10) are formed with the grooves 70. Therefore, if expressing these together, at step S12, in some of the unprocessed caps, parts thereof are removed so that the caps can more easily deform when receiving a load from the crankshaft 3.

Next, at step S13, the unprocessed caps and the processed caps are assembled to the cylinder block. Specifically, the processed caps which were processed to remove parts are assembled to the intermediate journals (31#2, 3143) among the plurality of journals 31 of the crankshaft 3. Further, the unprocessed caps which were not processed to remove parts are assembled to the side journals (31#1, 31#4) among the plurality of journals 31.

Above, preferred embodiments according to the present disclosure were explained, but the present disclosure is not limited to these embodiments and may be modified or changed in various ways within the language of the claims.

REFERENCE SIGNS LIST 1 internal combustion engine
2 cylinder block assembly
3 crankshaft
4 piston
5 connecting rod
10 cylinder block
11 cylinder
13 crank bearing
20 crank cap
22 crank bearing
31 crank journal
60, 64 hole parts

The invention claimed is:

1. A cylinder block assembly comprising: a cylinder block having three cylinders aligned side-by-side; and four crank caps arranged side-by-side in an alignment direction of the cylinders and fastened to the cylinder block, wherein
the crank caps and the cylinder block are provided with crank bearings which rotatably support a crankshaft,
the crank caps are arranged at both sides of each cylinder in the alignment direction; and
two intermediate crank caps positioned at intermediate positions in the plurality of the crank caps arranged side-by-side are configured to have shapes including removed parts which are removed compared with side crank caps positioned at both ends, so as to more easily deform when receiving a load from the crankshaft compared with the side crank caps.

2. The cylinder block assembly according to claim 1, wherein the removed parts include hole parts extending passing through the crank caps.

3. The cylinder block assembly according to claim 2, wherein one crank cap includes a plurality of the hole parts.

4. The cylinder block assembly according to claim 3, wherein the plurality of the hole parts provided at one crank cap are arranged in a direction perpendicular to an alignment direction of the cylinders and a direction in which the crank caps are attached to the cylinder block.

5. The cylinder block assembly according to claim 3, wherein the plurality of the hole parts provided at one crank cap have the same shapes as each other.

6. The cylinder block assembly according to claim 2, wherein the hole parts are formed so as to extend in an alignment direction of the cylinders.

7. The cylinder block assembly according to claim 1, wherein the removed parts include grooves formed at side surfaces of the crank caps positioned in the alignment direction of the cylinders.

8. The cylinder block assembly according to claim 7, wherein the grooves are formed to be symmetrical shapes on the both side surfaces of the crank caps positioned in the alignment direction of the cylinders.

9. The cylinder block assembly according to claim 1, wherein at least parts of the removed parts are arranged so as to overlap bearings of the crank caps when viewed in the direction of attachment to the cylinder block.

10. The cylinder block assembly according to of claim 1, wherein the intermediate crank caps have the same shapes as each other.

11. The cylinder block assembly according to claim 1, wherein the side crank caps have the same shapes as each other.

12. A method of production of a cylinder block assembly comprising: a cylinder block having three cylinders aligned side-by-side and four crank caps arranged side-by-side in an alignment direction of the cylinders and fastened to the cylinder block to rotatably support a crankshaft, the method comprising steps of:
producing a plurality of crank caps of the same shapes;
performing removal processing for removing part of some of the crank caps among the produced crank caps so as to easily deform when receiving a load from the crankshaft;
assembling the crank caps, to which the removal processing have been performed, to two intermediate crank journals positioned at intermediate positions among a plurality of crank journals of the crankshaft; and
assembling crank caps, to which the removal processing have not been performed, to side crank journals positioned at two ends among the plurality of crank journals.

13. The method of production of a cylinder block assembly according to claim 12 wherein the removal processing includes processing for forming hole parts passing through the crank caps or processing for forming grooves at side surfaces of the crank caps positioned in the alignment direction of the cylinders.

* * * * *